W. G. DEVEREUX.
AGITATOR FOR LIQUID MATERIALS.
APPLICATION FILED FEB. 2, 1922.
1,430,362.
Patented Sept. 26, 1922.
2 SHEETS—SHEET 1.
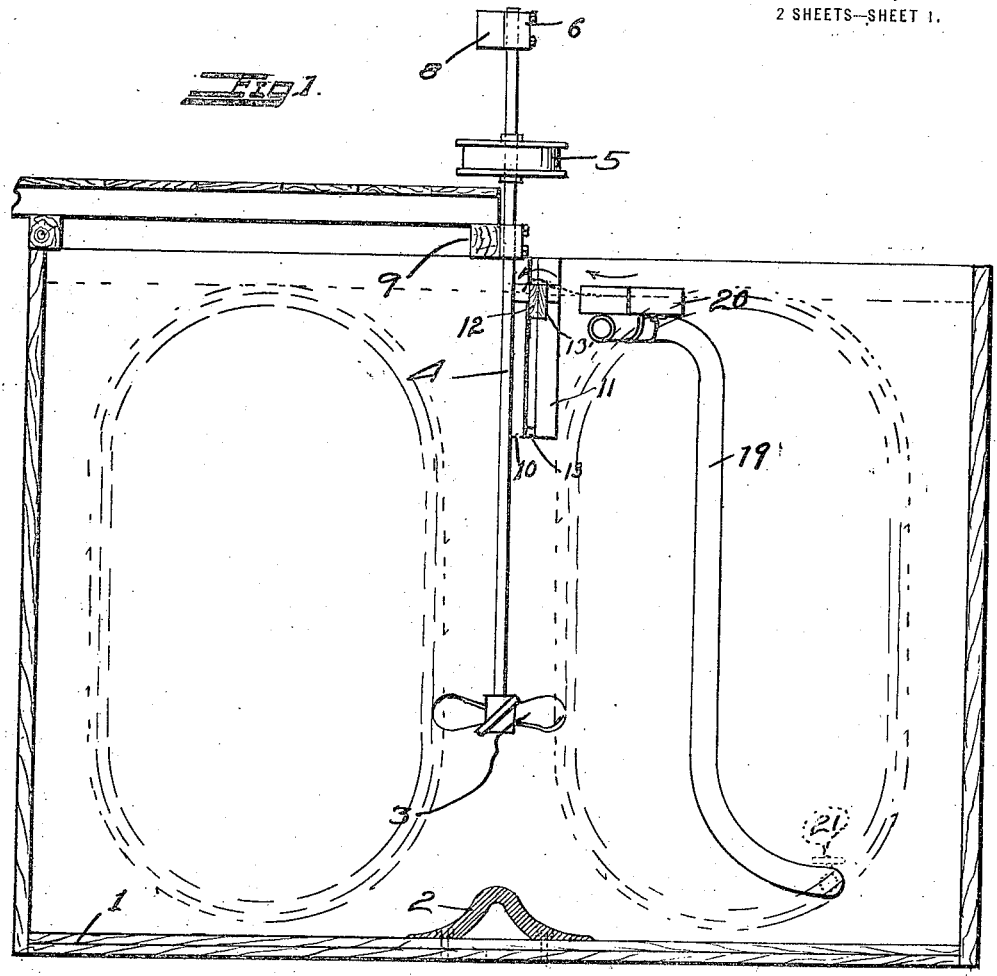
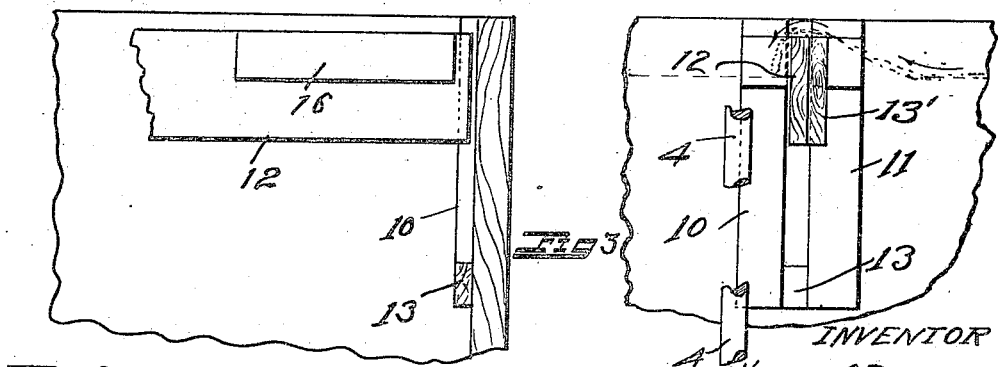
INVENTOR
William G. Devereux
BY Carlos P. Griffin
ATTORNEY.

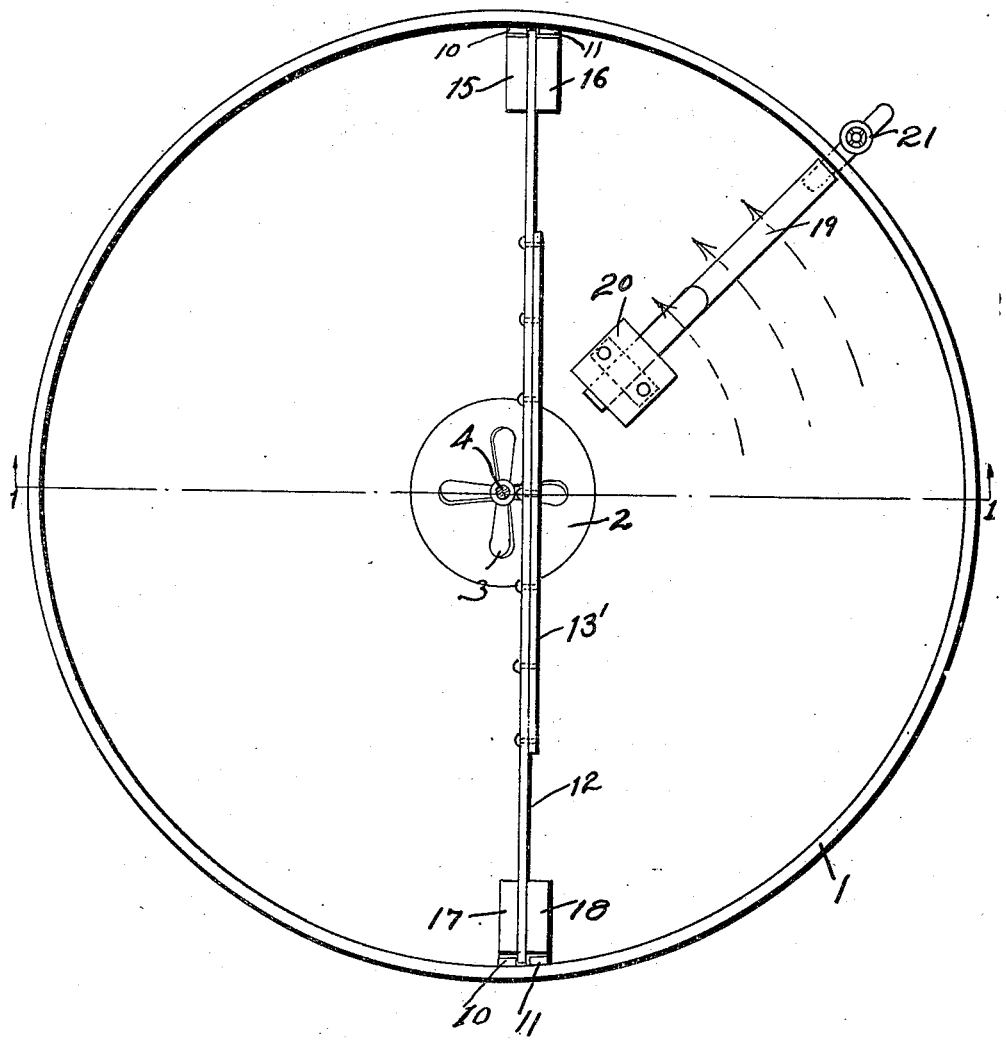

Patented Sept. 26, 1922.

1,430,362.

UNITED STATES PATENT OFFICE.

WILLIAM G. DEVEREUX, OF SAN MATEO, CALIFORNIA.

AGITATOR FOR LIQUID MATERIALS.

Application filed February 2, 1922. Serial No. 533,654.

*To all whom it may concern:*

Be it known that I, WILLIAM G. DEVEREUX, a citizen of the United States, residing at San Mateo, in the county of San Mateo, State of California, have invented a new and useful Agitator for Liquid Materials, of which the following is a specification in such full and clear terms as will enable those skilled in the art to construct and use the same.

This invention relates to an improvement in agitating devices intended to keep liquids or liquids containing slimes or other finely divided substances such as are commonly found in the metal mining arts in the solution, and to aid in aerating such solutions.

It will be understood by those skilled in the art that in many industrial arts it is necessary to agitate bodies of liquid containing more or less finely divided particles for the purpose of bringing the materials therein into solution or for other treatment thereof, and in the cyanide process and other processes it is very necessary to provide for the adequate aeration of the material under treatment.

With this invention the agitator is so placed as to be at a sufficient height from the bottom of the tank containing the materials to be agitated as to prevent it from being interfered with by the settled sludge after decanting operations have taken place, and in order to prevent the agitator from slowly whirling the entire mass of material in the tank around without agitating or aerating it, a floating baffle is provided which is so arranged as to cause a wave to break over it on opposite sides of the center of the tank, whereby the undue whirling of the mass is prevented, and whereby the wave breaking over the baffle is caused to entrap a considerable quantity of air continuously thereby improving the leaching process or otherwise affecting the solutions with air as may be required.

This invention is an improvement in the agitating device shown in the patent to W. B. Devereux, No. 781,406 granted January 31, 1905, in which patent a series of baffles are shown for preventing the rotation of the material in the tank, but which baffles on many ores permit the upper liquid in the tank to settle to such an extent as to produce practically clear solution at the top.

The principal object of the floating baffle is to provide means for breaking up the fluid under agitation at all times regardless of the height of fluid in the tank, thereby avoiding the necessity of the workman adjusting the height of the baffle whenever fluid is run into the tank.

Another object of the invention is to provide a shield at the bottom of the tank which will be so curved on flow lines as to increase the scouring action in the tank bottom thereby preventing the accumulation of non-agitated material on the tank bottom.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a vertical sectional view of the tank showing the agitator and baffle in their relative positions.

Fig. 2 is a sectional view of the tank adjacent the end of the baffle plate.

Fig. 3 is a side elevation of the inside of the tank showing the guide in which the baffle plate is movable, and Fig. 4 is a plan view of the tank showing the relation of the baffle plate to the tank and agitator.

The numeral 1 represents the receptacle within which the fluids to be agitated are placed. This receptacle is any desired form of tank and has a shield at 2 in its center under the propeller wheel 3 to more easily direct the flow of fluid outwardly from the center of the tank.

The propeller wheel 3 is carried by a supporting shaft 4 which in turn is rotated by means of a suitable pulley 5 in two supporting journal boxes 6 and 7. The journal boxes are carried by two cross strings 8 and 9 supported from any desired frame work.

At opposite sides the tank has two cleats 10 and 11 which are secured to the tank sides and spaced apart sufficiently to produce a groove to receive the baffle plate 12, a block 13 at the bottom of the guides 10 and 11 prevents the baffle plate from falling down far enough to be interfered with by the propeller, and provides for the proper operation of the baffle plate throughout a considerable difference in height of solution in the tank.

The baffle plate consists of a flat board 12' stiffened by having an additional flat board 13' secured thereto in its middle portion. It is supported by means of the blocks 13 or by means of the solution through the aid of four floats 15, 16, 17 and 18. If desired the solution may be decanted off by means of the pipe 19 which is supported by the float 20 and which is connected to a discharge gate 21 at the bottom of the tank.

In operation the agitator is driven from any suitable source of power and as it is sufficiently high from the bottom of the tank to prevent the accumulated sludge from preventing its operation, it may be started at any time. When the material has started to agitate it will be thrown downwardly from the propeller, and will tend to travel in the direction indicated by the dotted lines Figure 1, but at the same time the rotation of the propeller will also give to the solution a circular movement in the direction indicated by the arrows Figure 4. As the baffle floats on the liquid this will in a short time cause the liquid to break in a wave over the top of the baffle plate substantially as illustrated by the dotted lines in Figure 3, thus the undue rotation of the entire body of fluid is reduced at the same time the wave breaking over the top of the baffle plate will entrap a sufficient quantity of air to properly aerate the liquid.

What I claim is as follows, but various modifications may be made in the construction shown in the drawings and above particularly described form, within the purview of my invention.

1. In an apparatus of the class described a liquid receptacle, an agitator therein for circulating the liquid in the receptacle, and a floating baffle plate to retard the rotation near the surface of the liquid.

2. An apparatus of the class described comprising a liquid receptacle, an agitator therein, a baffle plate supported by the tank and free to move through a considerable height, said baffle plate being adapted to float upon the surface of the liquid being agitated in the tank.

3. An apparatus of the class described comprising a tank, an agitator therein, a baffle plate extending across the tank and being supported to freely move vertically with respect thereto, said baffle plate having floats whereby it will be supported by the liquid in the tank at the surface thereof.

4. An apparatus of the class described comprising a tank, an agitator therein, a shield at the bottom of the tank under the agitator to direct the flow of fluid from the agitator outwardly, a baffle plate slidably mounted in guides carried by the tank, said baffle plate being adapted to float upon the top of the liquid in the tank to prevent it from rotating too rapidly during the time of agitation.

5. An apparatus of the class described comprising a tank, an agitator therein, means to decant the fluid from said tank, a shield at the bottom of the tank under the agitator to permit the flow of fluid from the agitator outwardly, a baffle plate extending entirely across the tank at the top thereof, said baffle plate being supported to move freely in vertical guides at the sides of the tank, and floats for supporting said baffle plate with its upper edge above the surface of the liquid to be agitated.

6. An apparatus of the class described comprising a tank, an agitator therein, a shield at the bottom of the tank under the agitator to improve the flow lines of the tank and cause the fluid to work outwardly uniformly from the center, and a floating baffle plate for preventing the rotation of the material in the tank at the surface thereof.

7. An apparatus of the class described comprising a tank, an agitator therein, a shield at the bottom of the tank under the agitator to improve the flow lines of the tank and cause the fluid to work outwardly from the center in all directions uniformly, a floating baffle plate diametrically across the tank, and means to prevent the rotation of said baffle plate and thereby prevent the rotation of the fluid in the tank.

In testimony whereof I have hereunto set my hand this 12th day of January, A. D. 1922.

WILLIAM G. DEVEREUX.